No. 790,956. PATENTED MAY 30, 1905.
G. B. ELLINGWOOD.
MACHINE FOR COATING PANS WITH CHOCOLATE.
APPLICATION FILED JULY 22, 1904.
4 SHEETS—SHEET 1.
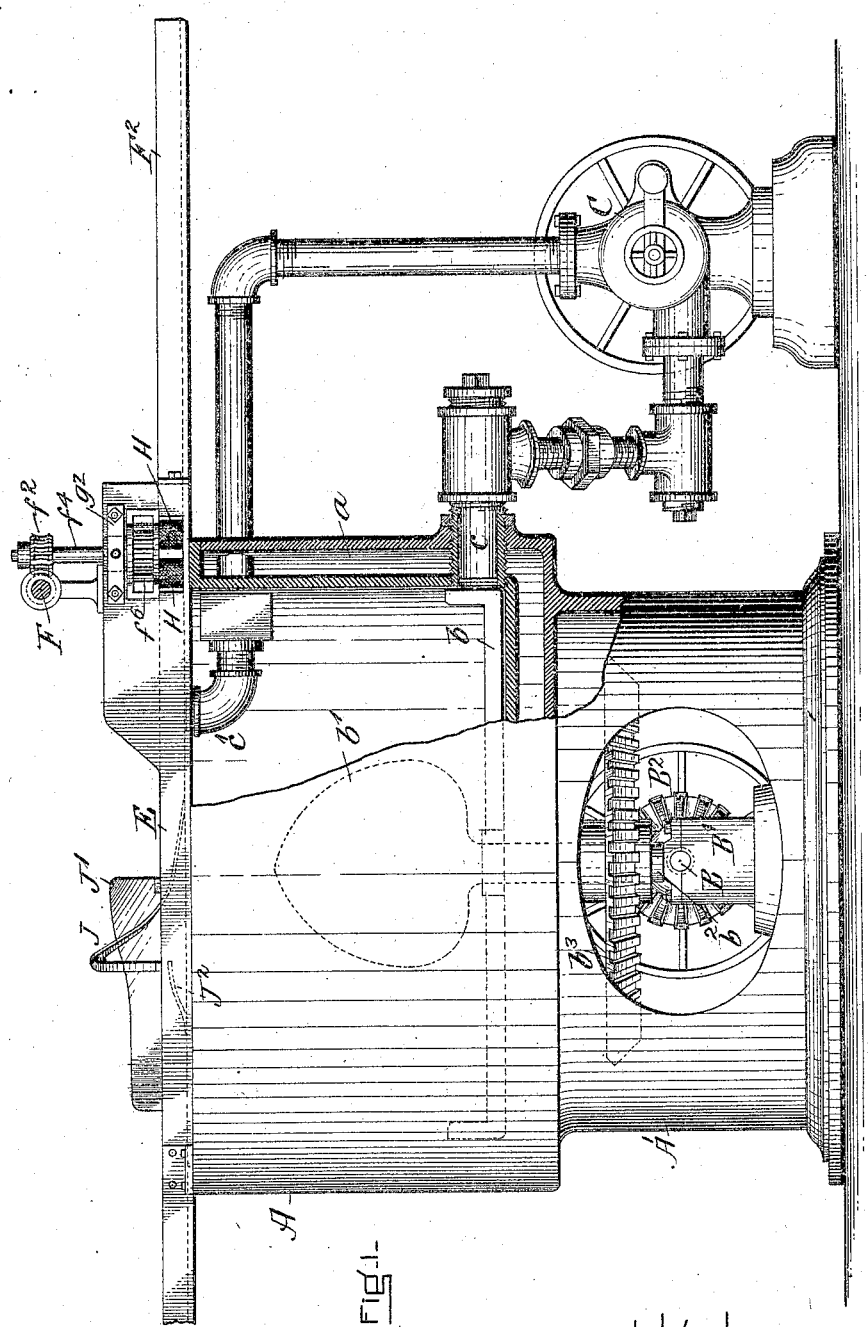

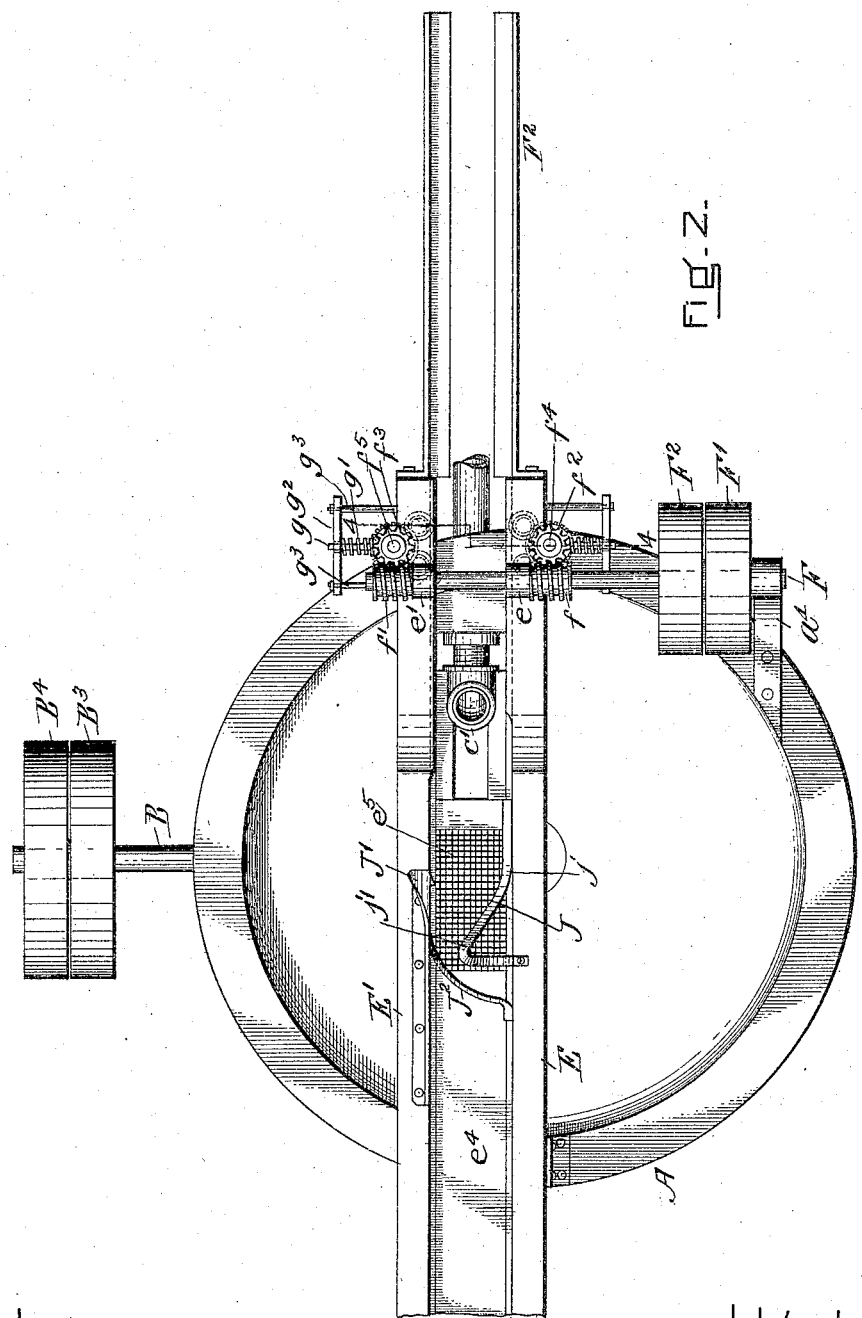

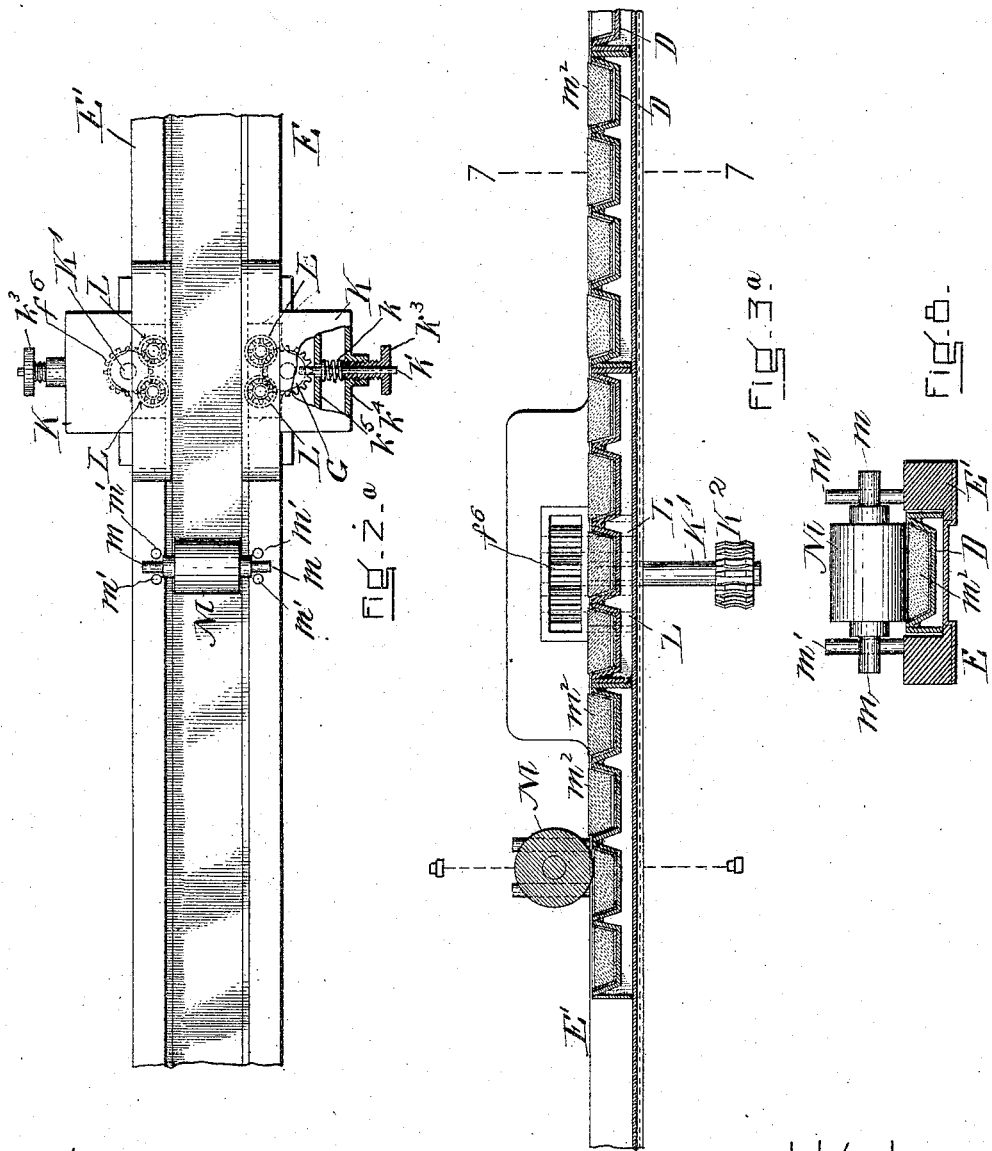

No. 790,956. PATENTED MAY 30, 1905.
G. B. ELLINGWOOD.
MACHINE FOR COATING PANS WITH CHOCOLATE.
APPLICATION FILED JULY 22, 1904.
4 SHEETS—SHEET 4.
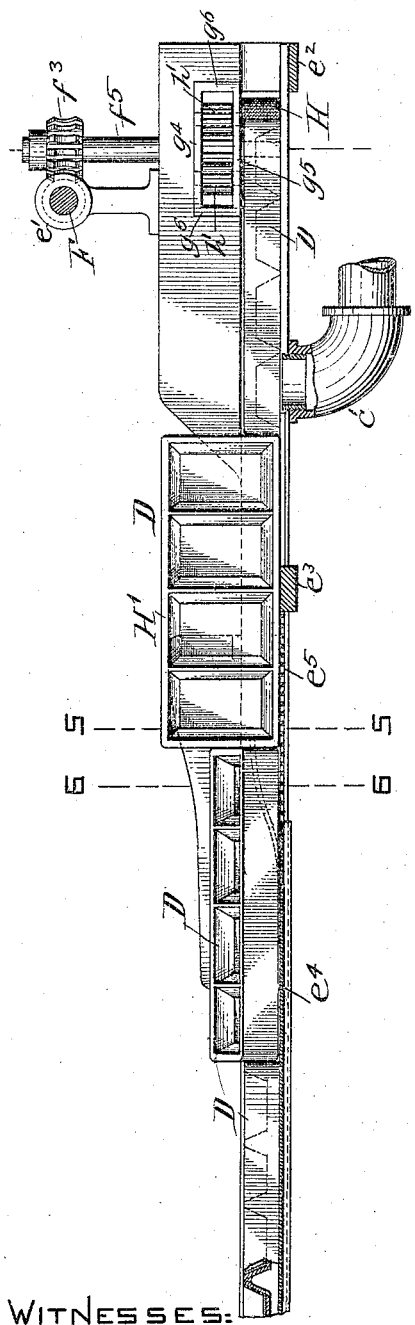
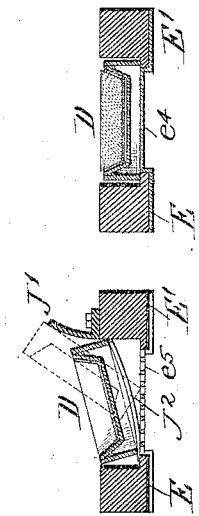
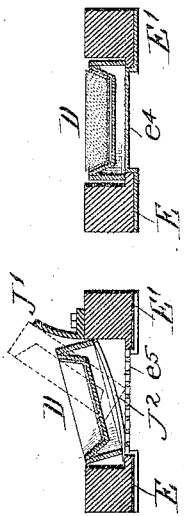
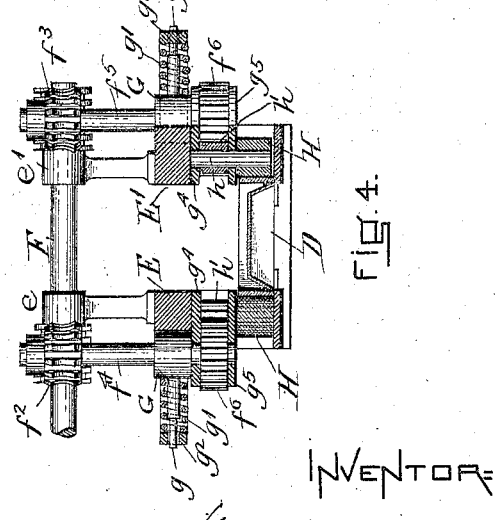
WITNESSES: INVENTOR:

No. 790,956.                                                                    Patented May 30, 1905.

UNITED STATES PATENT OFFICE.

GEORGE B. ELLINGWOOD, OF MALDEN, MASSACHUSETTS, ASSIGNOR TO THE WALTER M. LOWNEY COMPANY, OF BOSTON, MASSACHUSETTS, A CORPORATION OF MASSACHUSETTS.

MACHINE FOR COATING PANS WITH CHOCOLATE.

SPECIFICATION forming part of Letters Patent No. 790,956, dated May 30, 1905.

Application filed July 22, 1904. Serial No. 217,622.

*To all whom it may concern:*

Be it known that I, GEORGE B. ELLINGWOOD, a citizen of the United States, residing at Malden, in the county of Middlesex and State of Massachusetts, have invented a new and useful Improvement in Machines for Coating Pans with Chocolate, of which the following is a specification.

Chocolate creams have been made in the form of cakes—say three inches by two inches in size—comprising an interior filling of a cream mixture and an exterior of chocolate. In making these creams a pan or mold is first coated with chocolate, the filling is laid into it, and the whole is then covered with another coating of chocolate.

My invention hereinafter described is especially designed for the preliminary coating of the pan, leaving in it a layer or lining of chocolate sufficiently thick to form the bottom and sides of the finished product and also for the pressing of the filling therein, leaving the final coating to be added by hand or another machine, as seems best. It will be noted that in this machine the pans are inserted bottom side up, and the melted chocolate is forced by a pump into each pan. Means are provided for draining the pans and for turning them over, so that they will be in readiness to receive the filling, which is laid in by hand, and the top coating.

My invention will be understood by reference to the drawings, in which—

Figure 1 is a side elevation of a machine embodying my invention, a portion being broken away to show its interior construction. Fig. 2 is a plan. Fig. $2^a$ shows an extension thereof. Fig. 3 is a longitudinal section of the ways on which the pans travel, Fig. $3^a$ being an extension thereof. Fig. 4 is a section on line 4 4 of Fig. 2, and Figs. 5 and 6 are cross-sections on lines 5 5 and 6 6 of Fig. 3. Figs. 7 and 8 are cross-sections on lines 7 7 and 8 8 of Fig. $3^a$.

A is a jacketed kettle for holding the chocolate-supply, the chamber about the kettle being lettered $a$ and provided with suitable connections with a hot-water or steam supply by which the contents of the kettle will be kept at a proper temperature. The kettle is supported upon a suitable support $A'$. As shown, this support is cylindrical and provided with openings through which to reach the means whereby the agitators for stirring the contents of the kettle are operated. These consist of cross-bars $b$ and a fan-shaped piece $b'$, all mounted on a central vertical shaft $b^2$, suitably supported below the kettle and carrying a beveled gear $b^3$. In suitable bearings $B'$ is mounted a horizontal shaft B, carrying a pinion $B^2$ and fast and loose pulleys $B^3$ $B^4$, by which power is applied to turn the agitators. This mechanism is all old in the art.

C is a pump of a kind well known in the art and especially adapted for use in pumping melted chocolate or other material of semiliquid character. Its intake is connected with a suitable outlet from the kettle at $c$, and its outflow is preferably carried back through the walls of the kettle A near its top and terminates at $c'$ in a quarter-turn, so that the stream therefrom will be forced upward.

The pans or molds D, which are to be coated, are fed through the machine along a suitable guideway. The main portion of this guideway is formed of bars E E', the side walls of which at the entrance end are sufficiently high to form housings for the feeding mechanism, which will now be described.

F is a shaft, one end of which is supported in a bearing $a'$, mounted on the top of the kettle A, its other end being supported in bearings $e$ $e'$, mounted on the bars E E', respectively. The shaft F carries fast and loose pulleys $F'$ $F^2$ and also worms $f$ $f'$, which mesh with gears $f^2$ $f^3$, respectively, carried on vertical shafts $f^4$ $f^5$ and arranged to rotate said shafts in opposite directions. The lower end of each shaft $f^4$ $f^5$ carries a pinion $f^6$ and is journaled in a yielding box. These boxes are alike in mechanical construction; but each is the reverse of the other. Each comprises a bearing G, carrying a horizontal rod $g$, around which lies a spiral spring $g'$, held against the bearing G by the cross-bar $g^2$, through which the end of the rod $g$ passes. Each cross-bar is mounted on the ends of two arms $g^3$, projecting from the bars E E', respectively, and held in place on the said arms by nuts, so that the spring-pressure on the bearing may be adjusted, if necessary. Below the bearing G is a box comprising a plate $g^4$, through which a shaft $f^4$ $f^5$ passes, the bottom of the shaft being supported in a lower plate $g^5$, and the pinion $f^6$ lying between the plates $g^4$ $g^5$. These two plates are connected by side walls $g^6$. Vertical shafts $h$ are mounted in suitable bearings in the plates $g^4$ $g^5$ and rest upon the floor of the guideways. (See Fig. 4.) Each of these shafts carries a pinion $h'$ between the plates $g^4$ $g^5$ and in mesh with the pinion $f^6$ and at the lower end a feed-roll H. As stated above, this mechanism is duplicated, so that two pairs of feed-rolls are located, one pair on each side of the guideway, each pair mounted in a yielding box and each pair rotated in opposite direction from the other at the same speed to feed the pans D, which are fed to them by hand, and each pair adapted to yield slightly to conform to slight differences in the width of the pans.

The bars E E', forming the guideway, are connected at one end by cross-bars $e^2$ $e^3$ and for most of their length by a floor $e^4$, a portion of which is made of coarse wire-gauze, as at $e^5$, or is otherwise perforated to allow the surplus of chocolate draining off from the pans to fall back into the kettle A.

The pans D are laid upon the extensions $F^2$ of the guideway by hand, bottom side up, and each pan is pushed along the extensions until it reaches the feed-rolls H, by which it is carried along over the end $c'$ of the pump-outlet, where it receives the chocolate coating. The chocolate is warm and on striking the cold pan enough of it sticks thereto for the purpose intended. The next step is the turning of the pan right side up, the details of which are shown in Figs. 3 to 7, inclusive. In the machine shown in the drawings this is accomplished by two cam-surfaces mounted on the guideway, one a cam-strap J, mounted on the bar E, and the other a cam-plate J', mounted on the bar E'.

The cam-strap J is shaped as shown in Figs. 1, 2, and 5, from which it will be seen that it begins at a point $j$ with a gradual rise, which increases rapidly at the same time that it is bent out of a vertical plane toward the middle line of the guideway, as at $j'$, and there its effective cam-surface ceases. The purpose of this strap is to cause the edge of the pan which strikes it to ride up the incline, the opposite edge remaining in contact with the floor of the guideway, so that the pan assumes the position shown at H' in Fig. 3 and in full lines in Fig. 5, the dotted lines in Fig. 5 showing an intermediate position.

The cam-plate J' is shaped to receive the upper edge of the pan when a little farther advanced than is indicated in Fig. 5, so that the pan is tilted slightly beyond its center, and from this plate the pan is guided gradually down to a horizontal position by means of the cam-surface $J^2$, which crosses the floor of the guideway, so that each pan passes from the position shown in dotted lines in Fig. 6 to the position shown in full lines in that figure and the position shown in Fig. 7.

I have shown but one set of rolls to feed the pans to the coating-machine, and these serve to feed all the pans therethrough, that pan which is being fed by the rolls pushing all the pans in front of it, these rolls therefore accomplishing the upsetting of each pan in order with the assistance of the cams and finally pushing the pans off from the guideway upon a table or elsewhere. The next step is the placing of a piece of filling in each pan. This is done by hand; but thereafter the filling is preferably pressed in place by a roll, so that the fillings all bear substantially the same relation to the bottom of the pans, any surplus of chocolate in any case being squeezed out from below the filling by the pressure of the mechanism provided for that purpose. This may also be done by hand; but as it is a very tiresome piece of work it is best done by machinery—for example, in the manner now to be described.

I have shown at K two housings, one located on each of the guideways E E', each housing containing feed-rolls L L, in all respects like the feed-rolls H, being cylindrical in shape and mounted and operated in the same manner as the feed-rolls H, except that the worm (not shown) which operates them is located below the guideways and the shaft K', carrying the gear $K^2$, which meshes with said worm, extends downward from its pinion $f^6$ instead of upward. The various parts are in a guiding-box, pressure being exerted in this case against the bearing G, which carries the shaft K', by the action of the spring $k$ around the rod $k'$ acting between a collar $k^2$ on the rod $k'$ and a set-screw $k^3$, which turns in a threaded opening in the wall $k^4$ of the housing K. The cross-bar $k^5$ within the housing has an opening through it which keeps the rod $k'$ in proper alinement. As the other parts of this mechanism are like the corresponding parts at the other end of the guideways, they will not be further described. The pans are fed along by this feed mechanism to the pressing mechanism, which consists of a roll M, having projecting axes $m$, which lie between uprights $m'$ $m'$, mounted on the guideways E E', this roll being solid, so that of its own weight it will crowd down a cake of filling into the semiliquid chocolate in the pan. The cakes are shown at $m^2$ and are usually put in by hand just before the pan reaches the roll. The pan moves steadily forward and under the roll, which is turned by frictional contact with the cake or the edge of the pan, the cake being pressed down into the chocolate by the weight of the roll. While the roll need not be sufficiently heavy to press each filling down to the same level with every other, it should be sufficiently heavy to approximate such a level, so that the product of the machine shall be approximately uniform.

It will be seen that the essentials of this machine are simple, comprising means for coating and draining the pans and turning them over together with a feeding means, though this latter might be dispensed with and the pans fed by hand, though not so satisfactorily. In addition the pressing means may be used or not, as desired. The value of the invention lies not only in the fact that the machine is largely automatic, but also in that the pans are coated by a stream of chocolate always at a fixed temperature and running under a constant pressure and in that all the pans are allowed substantially the same time to drain, so that the product of the machine is substantially uniform.

The details of construction may be varied considerably without departing from my invention. I have shown upsetting-cams and have shaped them as shown because they have proved to be useful for the purpose; but other means will suggest themselves to those skilled in the art by which the upsetting of the pans may be accomplished.

What I claim as my invention is—

1. In a mold-coating machine, in combination with a feeding means adapted to engage each mold in turn, a coating-feed located below the line of movement of the molds and adapted to coat each mold in turn, as described.

2. In a mold-coating machine, a mold-feed, a coating-feed located below the line of movement of the molds, and means whereby the molds may be automatically reversed while moving substantially in a straight line, as set forth.

3. In a mold-coating machine, a mold-feed, a coating-feed located below the line of movement of the molds and means whereby the molds may be automatically reversed while moving in substantially a horizontal plane, as described.

4. In a mold-coating machine, a coating-feed located to deliver a stream upward, a mold-guideway located above the mouth of the feed, and means whereby molds fed along said guideway may be turned over after they have been coated, as set forth.

5. In a mold-coating machine, a coating-feed, a mold-feed, and means whereby the molds may be turned over while moving in substantially a straight line located upon the farther side of the coating-feed from the mold-feed.

6. In a mold-coating machine, a coating-feed, a mold-feed, means for turning over the molds after they have been coated, and draining-passages whereby the surplus of the coat may be drained from said molds during the turning operation, as described.

7. In a mold-coating machine, a coating-feed, a mold-feed, and means for turning the molds after they have been coated, comprising a cam-surface adapted to lift one edge of the mold through an angle of more than ninety degrees, as set forth.

8. In a mold-coating machine, a coating-feed, a mold-feed, and means for turning one edge of the mold through an angle of more than ninety degrees, and a cam-surface adapted to receive said edge so turned and guide it to a horizontal position, as set forth.

9. In a machine for coating molds, a pair of guideways adapted to receive a mold, a mold-feed located to feed a mold along said guideways, a coating-feed adapted to coat said mold, and means for inverting said mold comprising two cam-surfaces shaped substantially as described, one located on each side of the said guideways, as set forth.

10. In a mold-coating machine, a heated kettle, a pump, guideways supported on said kettle, connections leading from said kettle to said pump and from said pump to said guideways and there provided with an outlet over said kettle, and means for feeding pans thereto whereby said pans will be filled from said outlet and may drain back to said kettle, and the contents of said kettle, said connections, and the outlet, will be maintained at a constant temperature, as described.

11. In a mold-coating machine, a mold-feed, a coating-feed below the line of movement of the molds to deliver a jet upward against inverted moving molds, and means to automatically reverse the molds, as described.

12. In a mold-coating machine, a nozzle, means for feeding coating material thereto, guideways located above said nozzle, means for feeding molds to said guideways, and after said molds have been fed past said nozzle to reverse said molds, as described.

GEORGE B. ELLINGWOOD.

Witnesses:
GEORGE O. G. COALE,
M. V. FOLEY.